United States Patent

Mühlberger et al.

[11] Patent Number: 5,316,510
[45] Date of Patent: May 31, 1994

[54] METHOD AND DEVICE FOR RECYCLING COATED GLASS

[75] Inventors: Johann Mühlberger, Syrgenstein; Eberhard Gläser, Aichwald; Stefan Maier, Gerlingen, all of Fed. Rep. of Germany

[73] Assignee: Ed. Züblin Aktiengesellschaft, Stuttgart, Fed. Rep. of Germany

[21] Appl. No.: 919,195

[22] Filed: Jul. 24, 1992

[30] Foreign Application Priority Data

Jul. 25, 1991 [EP] European Pat. Off. ........ 91112464.2

[51] Int. Cl.⁵ ................................................. H01J 9/50
[52] U.S. Cl. ............................................ 445/2; 209/3; 241/20
[58] Field of Search .................. 241/20; 445/2; 209/3, 209/17, 18

[56] References Cited

U.S. PATENT DOCUMENTS

| | | | |
|---|---|---|---|
| 3,035,909 | 5/1962 | Holt | 51/317 |
| 4,010,991 | 3/1977 | Eiwen | 445/2 |
| 4,435,284 | 3/1984 | Heytmeijer | 209/3 |

FOREIGN PATENT DOCUMENTS

| | | |
|---|---|---|
| 3909380 | 3/1989 | Fed. Rep. of Germany . |
| 3901842 | 9/1990 | Fed. Rep. of Germany . |
| 4003497 | 8/1991 | Fed. Rep. of Germany . |
| 52-94673 | 9/1977 | Japan . |

Primary Examiner—Kenneth J. Ramsey
Attorney, Agent, or Firm—Robert W. Becker & Associates

[57] ABSTRACT

A method for recycling of coated glass, especially for reuse in a glass melt, comprises the steps of crushing the glass; transferring the crushed glass into a mixing unit; mixing the crushed glass for a predetermined time period; during the mixing step, adding liquid to the crushed glass and cleaning the crushed glass with the liquid; and removing the cleaned crushed glass from the mixing unit. The method is especially useful for recycling cathode-ray tubes.

13 Claims, 3 Drawing Sheets

METHOD AND DEVICE FOR RECYCLING COATED GLASS

BACKGROUND OF THE INVENTION

The present invention relates to a method and a device for recycling coated glass, especially glass of cathode-ray tubes.

Coated glass is used in a plurality of applications in various technological fields. For example, cathode ray tubes for television sets, computers, radar screens etc. are comprised of a glass screen with a coating of a fluorescent substance and a glass cone which is coated with a conductive lacquer. As a protection against radiation the screen glass contains barium and the cone glass contains lead oxide and barium in smaller concentrations.

Discarded cathode-ray tubes are disposed of in landfills despite the fact that the coatings contain not especially bonded poisonous substances. Cathode-ray tubes rejected during manufacturing because of defects that cannot be corrected are also disposed of in landfills.

In addition to the present environmental hazard due to the release of poisonous materials, the disposal of the cathode-ray tubes having a relatively large volume result in a considerable landfill space being used up and to the loss of glass (up to 20 kilograms per tube). In the Federal Republic of Germany approximately 4,000,000 cathode ray tubes as well as 1,000,000 tubes of computer monitors are discarded annually and, in addition, approximately 100,000 tubes are rejected during manufacturing so that a considerable amount of landfill space is needed for their disposal.

From German Offenlegungsschrift 39 01 842 a method for separating screen glass and cone glass of a cathode-ray tube is known. The cone and the screen, after their separation, may be cleaned, for example, by sand blasting or cleaning with high pressure water jets and can then be recycled. With this method the landfills are relieved to some extent. However, such a method is very energy-intensive and only successful when the glass screen, respectively, the glass cone are not damaged due to the sand blasting or high-pressure water jet treatment to such an extent that a reuse is impossible.

It is therefore an object of the present invention to provide a method for recycling of coated glass with which especially cathode-ray tubes may be recycled.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
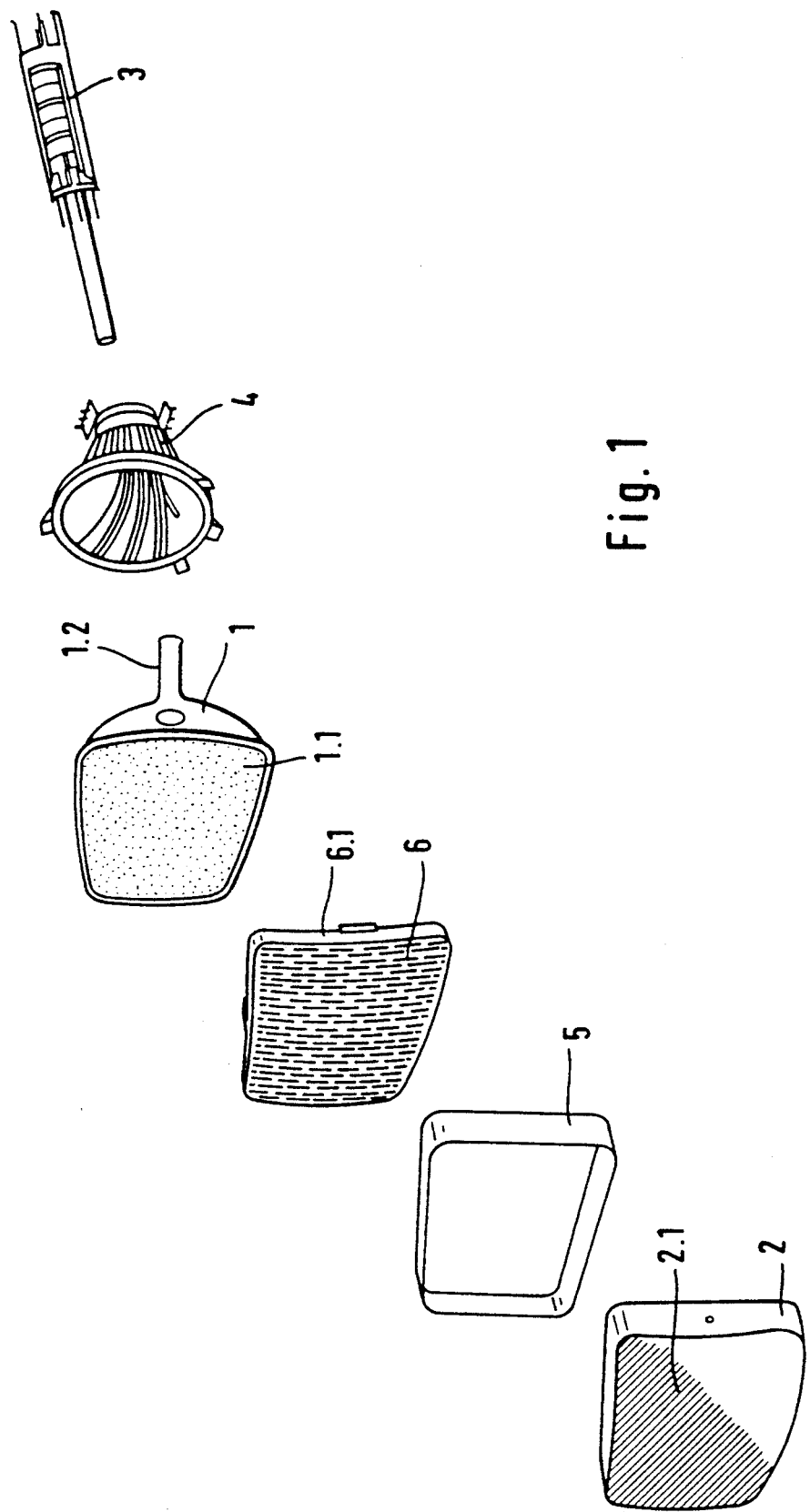
FIG. 1 is a schematic exploded view of the individual parts of a cathode-ray tube.

The method for recycling coated glass according to the present invention comprises the steps of:
crushing the glass;
transferring the crushed glass into a mixing unit;
mixing the crushed glass for a predetermined time period;
during the mixing step, adding liquid to the crushed glass and cleaning the crushed glass with the liquid; and
removing the clean crushed glass from the mixing unit.

In a preferred embodiment, the method further comprises the step of adding abrasive bodies to the crushed glass during the mixing step. The abrasive bodies preferably have an abrasive surface and are selected from the group consisting of balls ellipsoids and parallelepipeds. The abrasive bodies may also be selected from the group consisting of sand and metallic materials.

The method preferably further comprises the step of providing in the mixing unit inserts selected from the group consisting of blades, belts, and chains. Preferably, the mixing unit is a free-fall mixer.

Advantageously, the method further comprises the steps of circulating the liquid by pumping, and separating contaminants, washed off by the liquid, from the liquid. Preferably, the step of separating contaminants comprises allowing the contaminants to settle. In an alternative, the step of separating contaminants comprises filtering the contaminants.

Preferably the liquid used in the inventive method is water.

The method of the present invention is especially useful for coated glass of a cathode-ray tube and further comprises the steps of venting the cathode ray before the step of crushing the glass. Preferably, after crushing the glass of the cathode ray tube, metal parts and glass parts are sorted. It is expedient that during the step of venting the glass cone of the cathode ray tube the area of the cone neck is opened with a laser. Preferably, the glass parts from the screen and the glass parts from the glass cone of the cathode ray tube are separated. This separation may be carried out before or after the mixing step.

The step of cleaning of the inventive method is preferably preformed continuously.

The present invention is further concerned with a device for preforming the aforementioned method, the device comprising:
a crushing unit for crushing the glass;
a mixing unit;
a conveyor belt connected between the crushing unit and the mixing unit;
a means for circulating liquid through the mixing unit, the circuiting means connected to the mixing unit; and
a screen for separating the crushed glass from the liquid and contaminants washed off the crushed glass, the screen connected downstream of the mixing unit.

The mixing of the crushed glass within a mixing unit results in rubbing of the glass particles on one another so that thereby the coatings are removed. In addition to the removal of the coatings the intensive mixing of the crushed glass and the rubbing of the glass particles results in a smoothing of the edges so that the individual glass particles may be handled without any hazard of injury after the cleaning. Accordingly, glass particles of the screen and glass particles of the cone may be manually sorted for separate recycling steps. The liquid aids in removal of the rubbed-off coating particles so that the crushed glass treated within the mixing unit may be directly used for further recycling steps. Even when recycling is not possible, the end product of the mixing and cleaning operation may be disposed of in any landfill without presenting a hazard to the environment.

In order to increase the rub-off of the coating and thereby shortening the treatment time within the mixing, unit abrasive bodies may be added to the crushed glass within the mixing unit, whereby these abrasive bodies are preferably balls, ellipsoids, parallelepipads etc. with abrasive surfaces or sand or metallic materials. It is also advantageous to provide inserts within the mixing unit, for example, blades, belts, or chains.

The liquid used within the mixing unit is preferably water which may be circulated (pumped) within a closed circuit. In order to remove particles from the crushed glass which are only adhesively attached to the glass particles after the rubbing step, the crushed glass is guided through a blowing device. The water that is running off carries the washed-off contaminants out of the mixing unit and these contaminants may be separated from the water by allowing the contaminants to settle or by filtration.

In order to prevent hazardous implosions when handling the cathode ray tubes it is provided that the cathode-ray tubes are first vented and then crushed, whereafter the resulting glass particles and metal particles are sorted. It may also be advantageous to separate the screen glass and the cone glass before the treatment within the mixing unit in order to treat each portion individually so that the high-quality optical screen glass may be added to the melt for producing glass screens, while the cone glass of a lower optical quality may be used for the cone manufacture. It is especially advantageous when the glass particles of the screen and the cone which differ in their coloring are manually separated after the cleaning step for use in separate recycling operations.

DESCRIPTION OF PREFERRED EMBODIMENTS

The present invention will now be described in detail with the aid of several specific embodiments utilizing FIGS. 1 through 4.

The cathode-ray tube (in the following referred to as "tube") represented in FIG. 1 is comprised of a glass cone 1 having an inner coating 1.1 made of a conductive lacquer etc. The glass cone 1 is surrounded by a deflecting unit 4 which deflects the ray of the cathode-ray generator 3 according to the provided control voltage. The cathode-ray generator 3 is positioned within the cone neck.

Between the glass screen 2 with a coating 2.1 of a florescent material and the glass cone 1 a screen 6 is provided which is fastened with the aid of a frame 6.1. Within the cathode-ray tube thus assembled an implosion safety frame 5 is arranged between the screen 6 and the glass screen 2. The glass screen is connected via a connector in a pressure-tight manner to the glass cone.

A tube assembled from the individual components of FIG. 1 is subsequently tested for its operability When defects are detected they are, if possible, eliminated by further manufacturing steps. For this purpose it may be necessary to open the connector between the glass screen and the glass cone in order to separate the glass screen 2 from the glass cone 1. By sand blasting or by high-pressure water jet treatment a defective coating may be removed and the glass screen, respectively, the glass cone may be reintroduced into the production process.

Tubes with irreparable damages are rejected into a glass storage facility 10 (FIG. 2) which is essentially a large container. Via a ramp 9 transport vehicles may feed the tubes into the glass storage facility 10. During this step the especially sensitive cone neck 1.2 (FIG. 1) may break off which will result in an implosion of the tube. For preventing this the tubes are opened before placing them into the glass storage facility 10. This is, for example, achieved by opening the glass cone within the area of the cone neck with a laser so that the tube is vented. The tubes are then picked up by the gripping device of a crane 11 which is connected to the crane by a crane beam 12. The tubes are transported into the crushing unit 13 where the tubes are crushed. The crushed glass particles the size of which is determined by the type of the crushing unit 13 and the treatment time is guided from the crushing unit 13 via the conveyor belt 14 through a metal separator 15 where the parts of the cathode-ray tube are sorted into glass particles and metal parts, preferably by a magnetic separating step. The metal parts are discharged into a metal container 16 which is arranged along the side of the conveyor belt 14. The glass particles are further conveyed via the conveyor belt 14 to the inlet 17 of a mixing unit 18. During the operation of the crushing unit 13 a blower 19 is operated which removes dust particles via a filter. With this measure, a contamination of the environment with contaminated dust particles is prevented.

The represented mixing unit 18 is preferably a free-fall mixer, i.e., for removal of the coating from the glass particles the crushed glass is transported to the respective zenith and from there is released to free fall back to the bottom of the mixing unit. With these mixing movements the individual glass particles rub against one another thereby creating a cleaning effect with which the coating of the glass particles is completely removed. Furthermore, the mixing movements result in a grinding of the sharp edges resulting from the crushing process so that crushed glass particles may be manually handled during further processing steps without presenting an injury hazard.

The entire amount of treated crushed glass, the liquid, especially water, as well as the rubbed-off coating particles are conveyed together onto the screen 23. Here, the crushed glass is freed from adhered particles of the coating by a plurality of jets of a blowing device 27. The cleaning liquid with rubbed off glass material and coating particles, respectively, contaminants is transferred by a pump 20 into a filtering device 21 in which the solid particles and contaminants are separated from the cleaning water. The liquid is then recycled via the line 26 into the fixing unit 18. The washed-off and rubbed-off material of the coating, i.e., the contaminants, that have been filtered out in the filter device is removed (arrow 22) and may be disposed of in a landfill if it cannot be further used, this material only requiring a small volume of land fill space.

Screen 23 contains the cleaned crushed glass which is removed from there via a conveyor belt 24 and conveyed into a glass container 25. From here the glass can be transported to locations of further use.

A necessary requirement for melting glass is the introduction of portions of crushed glass for introducing a certain amount of energy into the melt. For this purpose the glass recycled according to the present invention may be used. The introduction of up to 10% of recycled glass into the glass melt is a realistic figure.

Figure 2:
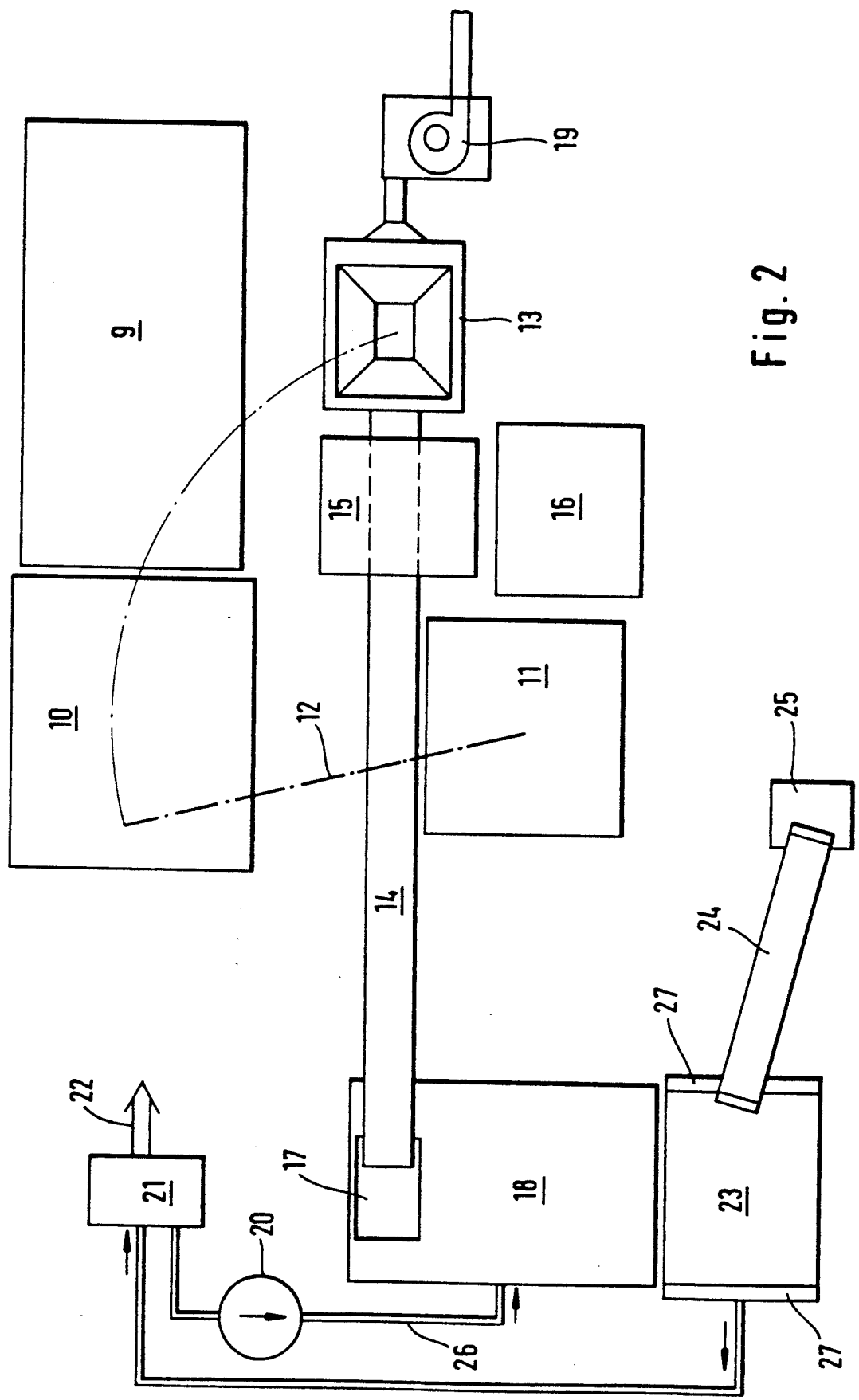
FIG. 2 is a schematic representation of a device for recycling coated glass, especially glass of a cathode-ray tube.
Figure 3:
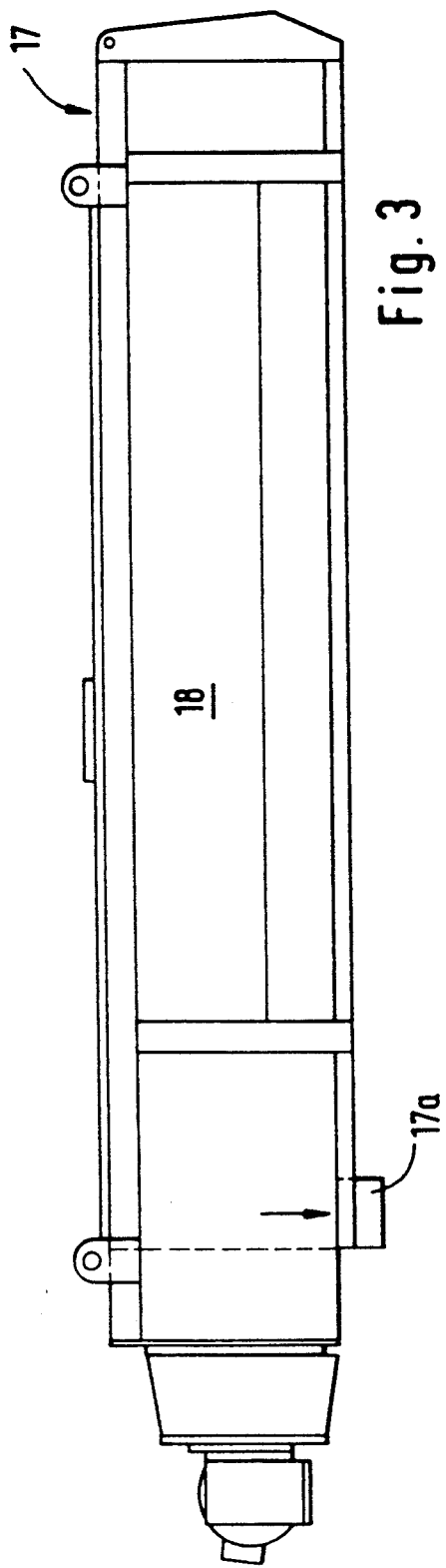
FIG. 3 is a side view of a continuous mixing unit.
Figure 4:
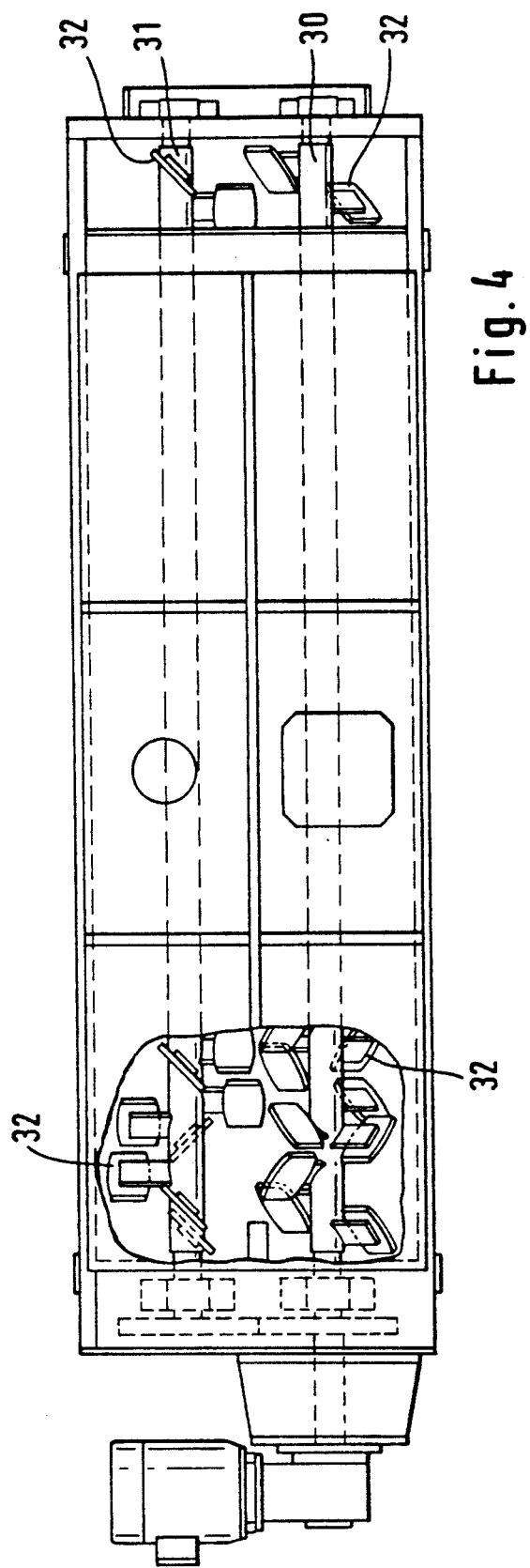
FIG. 4 is a plan view of a continuous mixing unit according to FIG. 3.

FIGS. 3 and 4 show one embodiment of a mixing unit to be used with the device of FIG. 2 for a continuous operation. The crushed glass is introduced via the inlet 17 and the conveyor belt 14 (FIG. 2) into the mixing unit. The mixing unit is provided with two rotating mixing shafts 30 and 31 having radially extending mixing tools 32. The mixing tools are arranged such that when the mixing shaft 30 and 31 are rotated the crushed glass is conveyed in the longitudinal direction of the mixer 18 to the outlet 17a below which the screen 23 is preferably arranged. Due to the mixing action within the mixing unit 18 the individual pieces of the crushed glass rub against one another so that their coating is rubbed off and, as described above for FIG. 2, is removed by the added water. For supporting the cleaning effect abrasive bodies are added to the crushed glass particles in the mixing unit whereby the cleaning effect is considerably improved and the continuous throughput of the shown continuous mixing unit is also improved. Such abrasive bodies may be balls, ellipsoids, parallelepipeds, star-shaped bodies etc. with corners and edges or abrasive surfaces. In a preferred embodiment, sand or other metallic materials are added to the crushed glass particles and to the water in order to increase the cleaning effect. It may be advantageous to provide within the mixing unit inserts such as blades, belts, or chains which come into intensive contact with the glass pieces and effect the cleaning of the individual glass particles. The belts and chains are preferably connected with one of their ends to the inner side wall of the mixing drum.

In addition to continuously operating mixing units batch mixing units may be used.

The present invention is, of course, in no way restricted to the specific disclosure of the specification and drawings, but also encompasses any modifications within the scope of the appended claims.

What we claim is:

1. A method for recycling of coated glass of a cathode ray tube, said method comprising the steps of:
    venting the cathode-ray tube;
    crushing the cathode ray tube;
    sorting metal parts and crushed glass of the crushed cathode-ray tube;
    transferring the crushed glass into a mixing unit;
    mixing the crushed glass for a predetermined time period;
    during said mixing step, adding liquid to the crushed glass and cleaning the crushed glass with the liquid;
    circulating the liquid by pumping;
    separating contaminants, washed off by the liquid, from the liquid by a process selected from the group of allowing the contaminants to settle and filtering the contaminants; and
    removing the cleaned crushed glass from the mixing unit.

2. A method according to claim 1, further comprising the step of:
    during said mixing step, adding abrasive bodies to the crushed glass.

3. A method according to claim 2, wherein the abrasive bodies have an abrasive surface and are selected from the group consisting of balls, ellipsoids, and parallelepipeds.

4. A method according to claim 2, wherein the abrasive bodies are selected from the group consisting of sand and metallic materials.

5. A method according to claim 1, further comprising the step of:
    providing in the mixing unit inserts selected from the group consisting of blades, belts, and chains.

6. A method according to claim 1, wherein the mixing unit is a free-fall mixer.

7. A method according to claim 1, wherein the liquid is water.

8. A method according to claim 1, further comprising the step of:
    during said step of venting, opening a glass cone of the cathode ray tube in the area of the cone neck with a laser.

9. A method according to claim 1, further comprising the step of:
    separating glass parts from a screen of the cathode ray tube and glass parts from a glass cone of the cathode ray tube.

10. A method according to claim 9, wherein said step of separating is carried out before said mixing step.

11. A method according to claim 9, wherein said step of separating is carried out after said mixing step.

12. A method according to claim 1, wherein said step of cleaning is performed continuously.

13. A device for performing the method of claim 1, said device comprising:
    a crushing unit for crushing the glass;
    a mixing unit;
    a conveyor belt connected between said crushing unit and said mixing unit;
    a means for circulating liquid through said mixing unit, said circulating means connected to said mixing unit; and
    a screen for separating the crushed glass from the liquid and contaminants washed off the crushed glass, said screen connected downstream of the mixing unit.

* * * * *